US012331706B2

(12) United States Patent
Songprasert et al.

(10) Patent No.: US 12,331,706 B2
(45) Date of Patent: Jun. 17, 2025

(54) INTAKE MANIFOLD AND INTAKE DEVICE

(71) Applicant: MIKUNI CORPORATION, Tokyo (JP)

(72) Inventors: Natthavud Songprasert, Kanagawa (JP); Hiroyuki Yanazawa, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/395,656

(22) Filed: Dec. 25, 2023

(65) Prior Publication Data

US 2024/0328377 A1 Oct. 3, 2024

(30) Foreign Application Priority Data

Mar. 29, 2023 (JP) ................................ 2023-054004

(51) Int. Cl.
*F02M 35/112* (2006.01)
*F02M 35/10* (2006.01)

(52) U.S. Cl.
CPC .... *F02M 35/112* (2013.01); *F02M 35/10052* (2013.01); *F02M 35/10308* (2013.01)

(58) Field of Classification Search
CPC .......... F02M 35/112; F02M 35/10052; F02M 35/10308
USPC .................................................... 123/184.21
See application file for complete search history.

(56) References Cited

U.S. PATENT DOCUMENTS 5,341,773 A * 8/1994 Schulte ........... F02M 35/10321 285/305
2017/0335809 A1* 11/2017 Newman .......... F02M 35/10039
2018/0245556 A1* 8/2018 Kassai .............. F02M 37/0017

FOREIGN PATENT DOCUMENTS

JP 2011127507 6/2011

* cited by examiner

*Primary Examiner* — Lindsay M Low
*Assistant Examiner* — Omar Morales
(74) *Attorney, Agent, or Firm* — JCIPRNET

(57) ABSTRACT

An intake manifold M1 includes: a surge tank 10, formed in an elongated tubular shape in a direction of a predetermined axis S; branch pipes 20, extending from the surge tank; an upstream tubular part 50, continuous on an upstream side of the surge tank; an opening part 60, open at an upstream end of the upstream tubular part; a flange part 70, formed around the opening part; an annular seal groove 80, formed at the flange part around the opening part; and fastening parts 90, formed at the flange part around the annular seal groove to fasten a throttle unit. A groove width of the annular seal groove 80 is formed to decrease in the vicinity of the fastening part.

14 Claims, 16 Drawing Sheets

INTAKE MANIFOLD AND INTAKE DEVICE

CROSS-REFERENCE TO RELATED APPLICATION

This application claims the priority benefit of Japan application no. 2023-054004, filed on Mar. 29, 2023. The entirety of the above-mentioned patent application is hereby incorporated by reference herein and made a part of this specification.

BACKGROUND

Technical Field

The disclosure relates to an intake manifold and an intake device suitable for an intake system of an internal combustion engine mounted in a vehicle, etc., and particularly relates to an intake manifold and an intake device including a flange part for attaching a throttle unit to a surge tank.

Description of Related Art

As a conventional intake manifold, a resin-made intake manifold is known (see, for example, Japanese Laid-open No. 2011-127507), including: a surge tank formed in an elongated tubular shape in a direction of a predetermined axis; multiple branch pipes connecting an intake port of an internal combustion engine and the surge tank; an inlet pipe continuous on an upstream side of the surge tank; and a flange part formed at an end of the inlet pipe and provided for attaching a throttle valve device (throttle unit).

In the intake manifold, the outer profile of the flange part in a substantially rectangular shape is formed to be greater than an outer profile of the surge tank. In addition, the flange part includes four fastening holes at four corners thereof, a circular inflow opening part at the center, and a groove part having the same width in the annular shape and provided for inserting a gasket member on an inner side around the inflow opening part and sufficiently away from the four fastening holes.

Meanwhile, in the case where an intake device including such intake manifold is mounted in a vehicle, the space for disposing the manifold is limited, and, when it is necessary to sufficiently secure the size of the inflow opening part, it is necessary to reduce the outer profile of the flange part as well as a separation dimension of the four fastening holes while maintaining the inflow opening part to have a predetermined inner diameter dimension.

However, when only the outer profile of the flange part and the separation dimension of the fastening hole are reduced, the thickness is partially reduced. As a result, the mechanical strength may be reduced, and molding defects may occur when molding is performed by using a resin material, etc.

The disclosure has been made in view of the above, and an objective of the disclosure is to provide an intake manifold and an intake device having a small size, a sufficient mechanical strength, and facilitated moldability while attaining favorable assembling and seal properties.

SUMMARY

An intake manifold according to an embodiment of the disclosure includes: a surge tank, formed in an elongated tubular shape in a direction of a predetermined axis; multiple branch pipes, extending from the surge tank; an upstream tubular part, continuous on an upstream side of the surge tank; an opening part, open at an upstream end of the upstream tubular part; a flange part, formed around the opening part; an annular seal groove, formed at the flange part around the opening part; and multiple fastening parts, formed at the flange part around the annular seal groove to fasten a throttle unit. A groove width of the annular seal groove is formed to decrease in a vicinity of the fastening part.

An intake device according to another aspect of the disclosure is an intake device for controlling intake air of an internal combustion engine. The intake air device is configured to include: the intake manifold according any of the above configurations; a throttle unit, fastened to the flange part of the intake manifold; and an annular seal member, made of rubber, and fit with the annular seal groove of the intake manifold to be interposed between the flange part and the throttle unit.

DESCRIPTION OF THE EMBODIMENTS

Figure 1:
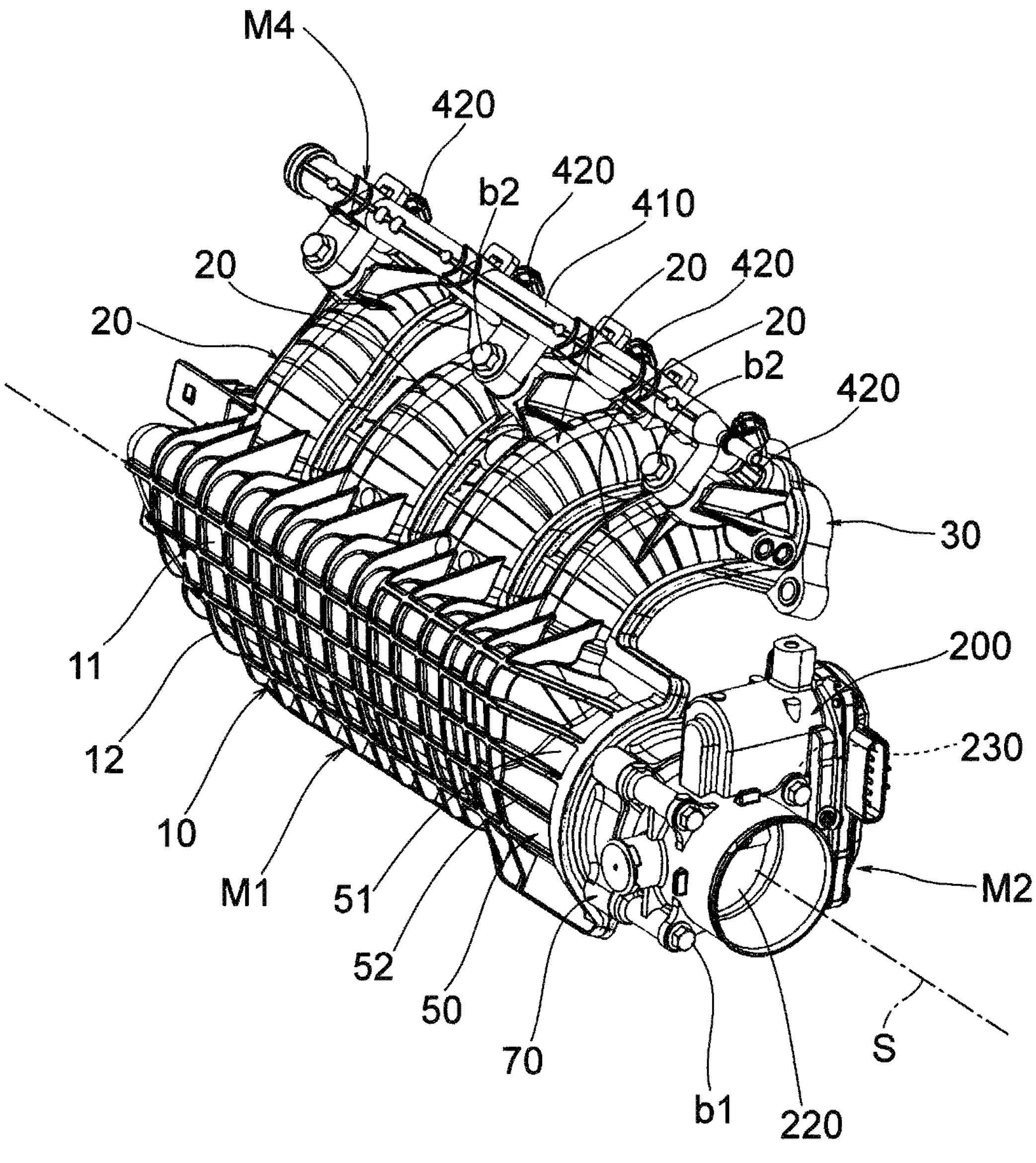
FIG. 1 is a perspective view illustrating the appearance of an intake device according to an embodiment including an intake manifold according to the disclosure.

An intake manifold according to an embodiment of the disclosure includes: a surge tank, formed in an elongated tubular shape in a direction of a predetermined axis; multiple branch pipes, extending from the surge tank; an upstream tubular part, continuous on an upstream side of the surge tank; an opening part, open at an upstream end of the upstream tubular part; a flange part, formed around the opening part; an annular seal groove, formed at the flange part around the opening part; and multiple fastening parts, formed at the flange part around the annular seal groove to fasten a throttle unit. A groove width of the annular seal groove is formed to decrease in a vicinity of the fastening part.

In the intake manifold, it may be configured that, in the vicinity of the fastening part, the annular seal groove is formed to be curved to be convex toward an inner side, so as to approach the opening part.

In the intake manifold, it may be configured that, when viewed from the direction of the axis, an outer profile of the flange part is formed to not protrude from an outer profile of the upstream tubular part.

In the intake manifold, it may be configured that, the fastening part includes: a nut, configured for screwing with a fastening bolt; and a fixing hole, configured for inserting or outserting the nut, and the annular seal groove includes a width-invariant region having a constant groove width and a width-gradually-variant region having a groove width that gradually and continuously varies so as to gradually decrease toward the fastening part and gradually increase away from the fastening part.

In the intake manifold, it may be configured that, the opening part is in a circular shape with the axis as a center, the fixing hole is circular, and the width-invariant region of the annular seal groove forms a portion of an annular shape with the axis as a center.

In the intake manifold, it may be configured that, thicknesses of both of an inner wall and an outer wall defining the annular seal groove are same in a region sandwiched between the opening part and the fixing hole and on a line orthogonal to the axis.

In the intake manifold, it may be configured that, the fixing hole is formed at a position partially overlapped with a virtual circle passing through an outer diameter of the width-invariant region of the annular seal groove.

In the intake manifold, it may be configured that, the fastening parts are disposed at equal intervals in a circumferential direction with the axis as a center.

An intake device according to another aspect of the disclosure is an intake device for controlling intake air of an internal combustion engine. The intake air device is configured to include: the intake manifold according any of the above configurations; a throttle unit, fastened to the flange part of the intake manifold; and an annular seal member, made of rubber, and fit with the annular seal groove of the intake manifold to be interposed between the flange part and the throttle unit.

In the intake device, it may be configured that, the annular seal member includes an annular seal part having a constant width smaller than a minimum groove width of the annular seal groove.

In the intake device, it may be configured that, the annular seal member includes multiple outer convex parts and/or multiple inner convex parts. In a uncompressed state before fastening, the outer convex parts protrude from the annular seal part to partially contact an outer wall of the annular seal groove, and the inner convex parts protrude from the annular seal part to partially contact an inner wall of the annular seal groove.

In the intake device, it may be configured that, the outer convex parts and/or the inner convex parts are formed to be disposed in width-invariant regions of the annular seal groove, and the width-invariant regions have a constant groove width.

In the intake device, it may be configured that, the throttle unit includes: a throttle valve, opening and closing a passage; and a driving unit, driving the throttle valve to open and close.

In the intake device, it may be configured that, the branch pipes of the intake manifold are curved in a predetermined orientation when viewed from the direction of the axis, and when viewed from the direction of the axis, the driving unit is disposed to not protrude from outer profiles of the surge tank and the branch pipes.

According to the intake manifold and the intake device having such configuration, the size can be reduced, the mechanical strength can be secured, and the moldability can be facilitated, while favorable assembling and seal properties can be attained.

In the following, the embodiments of the disclosure will be described with reference to the accompanying drawings.

An intake manifold according to the disclosure forms a portion of an intake device installed to an intake system of a four-cylinder internal combustion engine mounted in an automobile, for example, and is installed to a cylinder head of the internal combustion engine downstream of an air cleaner.

Figure 2:
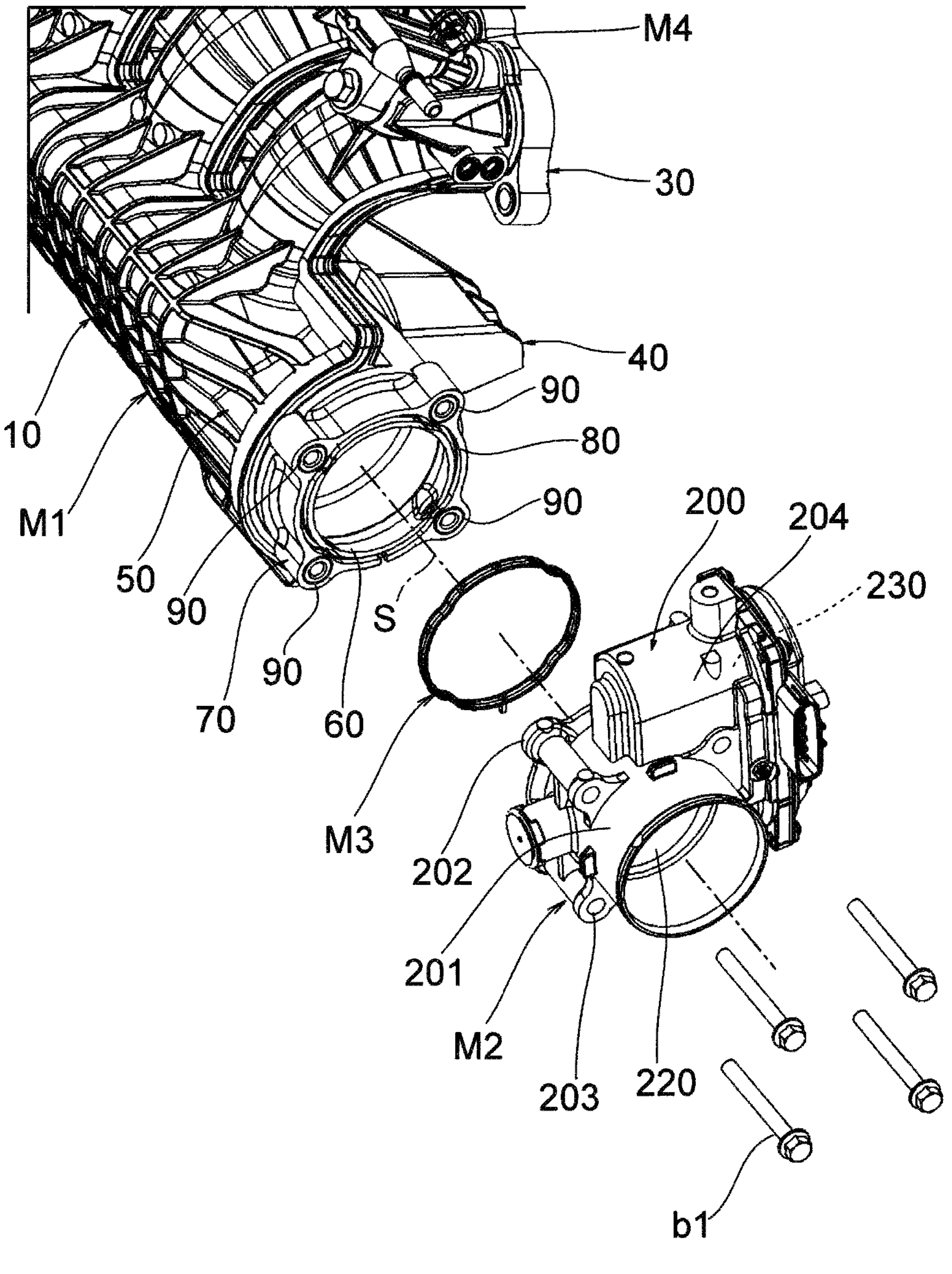
FIG. 2 is an exploded perspective view in which a throttle unit and an annular seal member are separated from the intake manifold in the intake device according to an embodiment.
Figure 3:
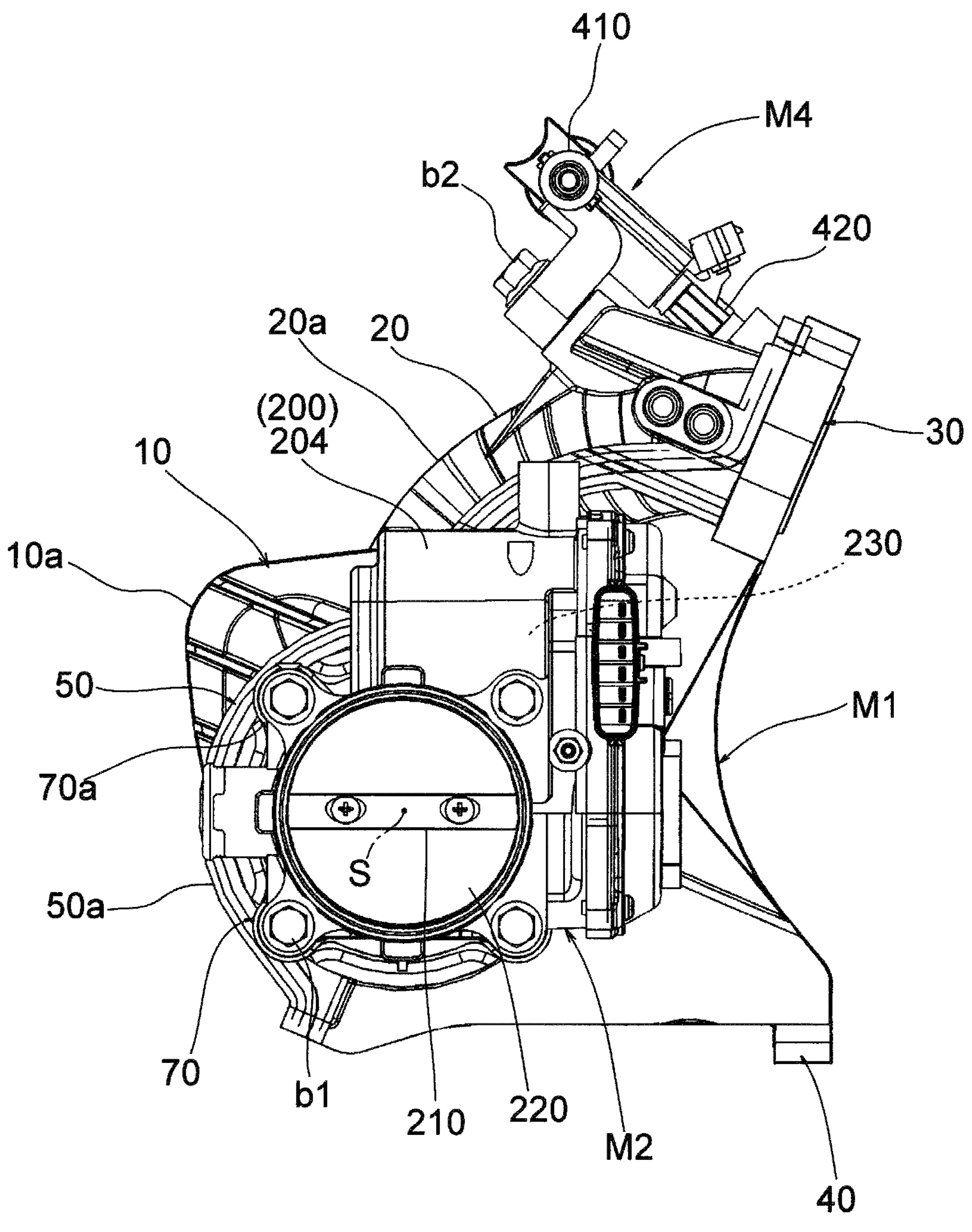
FIG. 3 is an end view illustrating the intake device according to an embodiment when viewed from a direction of an axis.

As shown in FIGS. 1 to 3, the intake device includes an intake manifold M1, a throttle unit M2, an annular seal member M3, and a fuel injection unit M4, etc.

Figure 4:
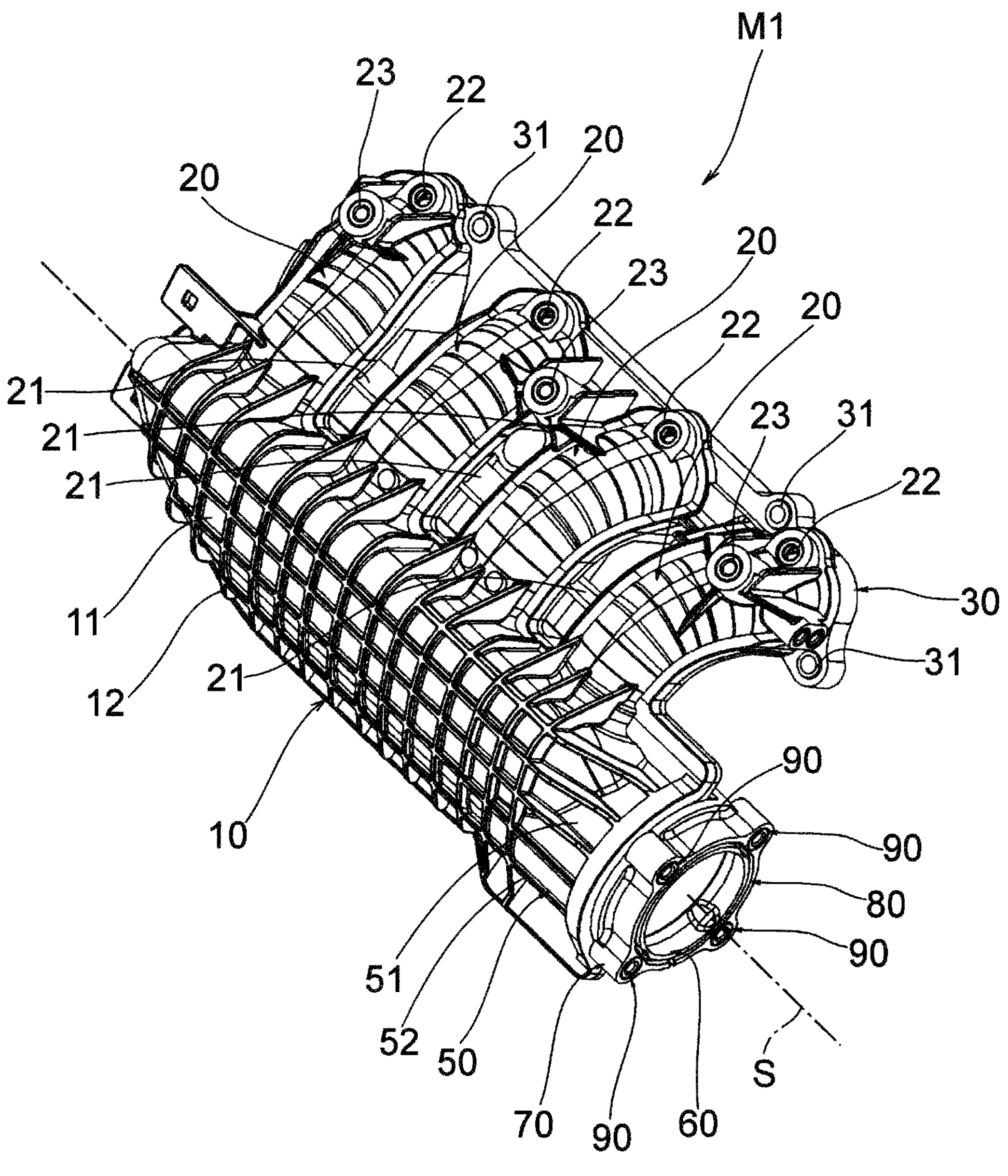
FIG. 4 is a perspective view illustrating the appearance of the intake manifold according to the disclosure, in which the throttle unit, the annular seal member, and a fuel injection unit are removed from the intake device according to an embodiment.
Figure 5:
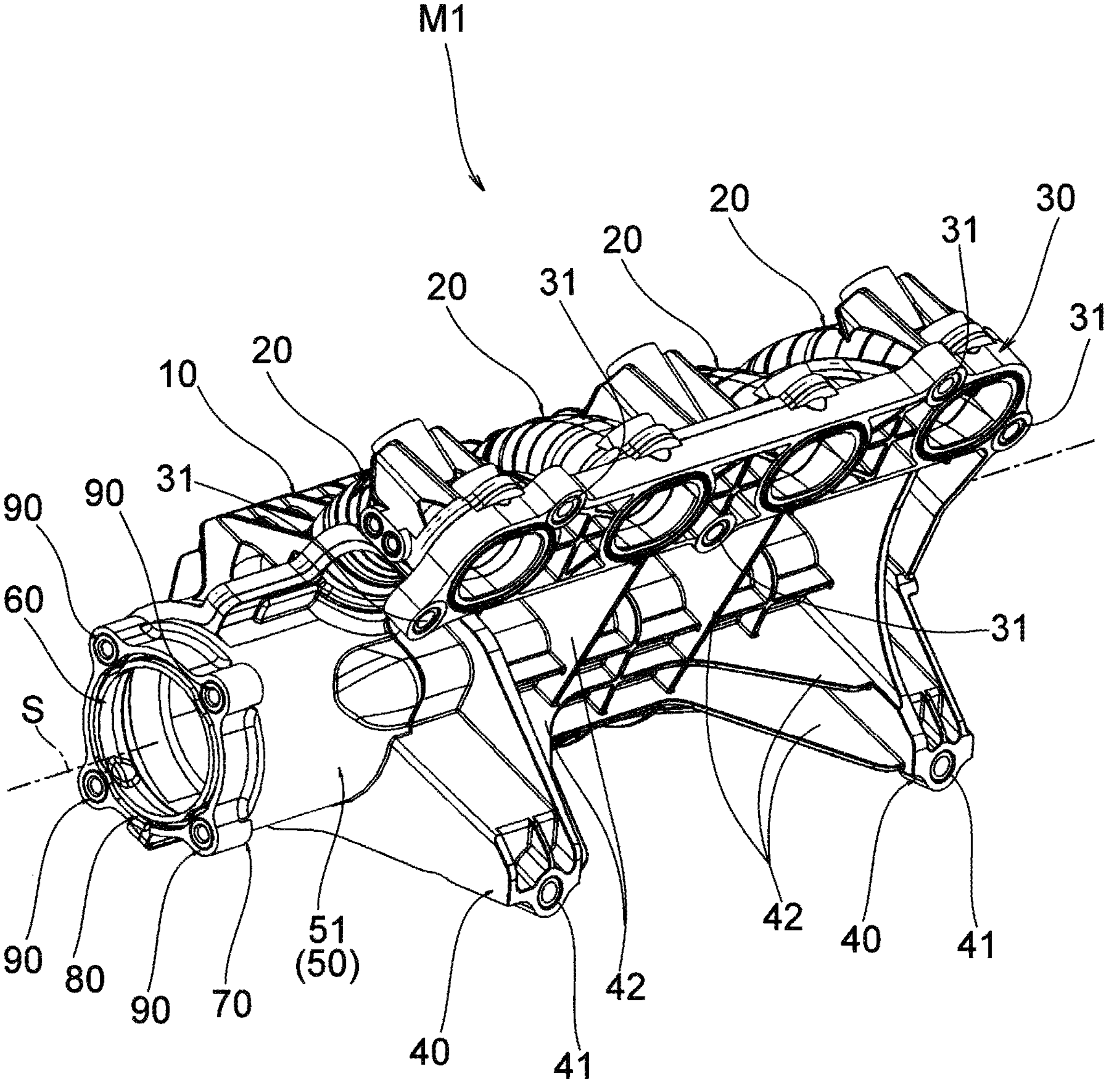
FIG. 5 is a perspective view illustrating the appearance of the intake manifold as shown in FIG. 4 when viewed from another direction.
Figure 6:
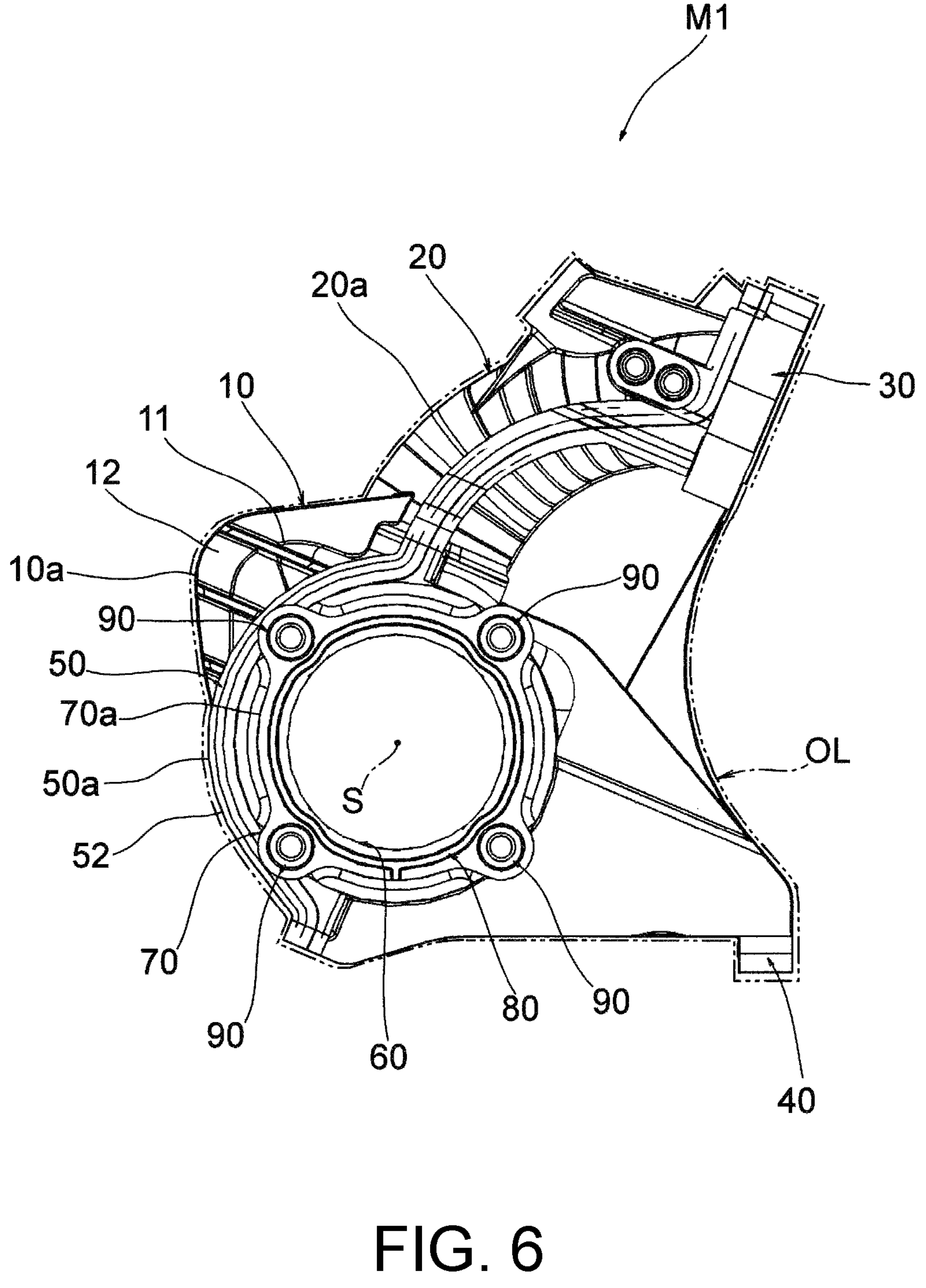
FIG. 6 is an end view illustrating the intake manifold as shown in FIG. 4 when viewed from the direction of the axis.

The intake manifold M1 according to an embodiment is formed by bonding multiple molded members through molding, and, as a complete product after assembling, includes a surge tank 10, multiple (four in the embodiment) branch pipes 20, a bonding part 30, a linking part 40, an upstream tubular part 50, an opening part 60 that guides in intake air, a flange part 70, an annular seal groove 80, and multiple (four in the embodiment) fastening parts 90, etc., as shown in FIGS. 4 to 6.

The surge tank 10 temporarily stores intake air, and is formed in an elongated tubular shape in a direction of a predetermined axis S. In addition, the surge tank 10 includes an outer wall 11 defining an internal space and multiple reinforcement ribs 12 protruding toward the outer side of the outer wall 11. As shown in FIG. 6, an outer profile 10*a* of the surge tank 10 is defined by outer edges of the reinforcement ribs 12. Here, as shown in FIG. 6, the outer profile 10*a* defines a portion of an outline (profile) OL of the intake manifold M1 when viewed from the direction of the axis S.

As shown in FIG. 4, the branch pipes 20 are arranged along the direction of the axis S to extend from the surge tank 10, and are linked with each other via reinforcement ribs 21. In addition, the branch pipes 20 are curved in a predetermined orientation when viewed from the direction of the axis S. That is, the branch pipes 20 are formed to be curved to be convex upward in FIG. 6. In addition, the branch pipes 20 include fitting holes 22 and screw holes 23. The fitting holes 22 are fit with injectors 420 included in the fuel injection unit M4 in the vicinity of the respective tip end sides of the respective branch pipes 20. The screw holes 23 are provided at three positions to screw with fastening bolts b2 (see FIG. 1) to fix a feed pipe 410 included in the fuel injection unit M4.

The bonding part 30 is bonded to the cylinder head of the internal combustion engine, and, as shown in FIGS. 4 and 5, links the branch pipes 20 to each other and is formed in an elongated substantially trapezoidal shape in the direction of the axis S. The bonding part 30 includes five circular holes 31 through which fastening bolts (not shown) pass through. The linking part 40 is linked with a portion (a cylinder block or the cylinder head) of the internal combustion engine. As shown in FIG. 5, the linking part includes two circular holes 41 and multiple reinforcement ribs 42. The circular holes 41 are provided at two positions separate in the direction of the axis S and formed to protrude in a direction perpendicular to the axis S from the surge tank 10, and fastening bolts (not shown) pass through the circular holes 41.

The upstream tubular part 50, as shown in FIGS. 1 and 4, is formed continuously on the upstream side of the surge tank 10 in the direction of the axis S and serves to guide the intake air into the surge tank 10 and as a space for temporarily storing the intake air. The upstream tubular part 50 has an outer wall 51 and multiple reinforcement ribs 52. The outer wall 51 is formed in a cylindrical shape with the axis S as the center, so as to define the internal space. The reinforcement ribs 52 protrude toward the outer side of the outer wall 51.

In addition, as shown in FIG. 6, an outer profile 50*a* of the upstream tubular part 50 is defined by outer edges of the reinforcement ribs 52. Here, when viewed from the direction of the axis S, the outer profile 50*a* defines a portion of the outline OL of the intake manifold M1.

Figure 7:
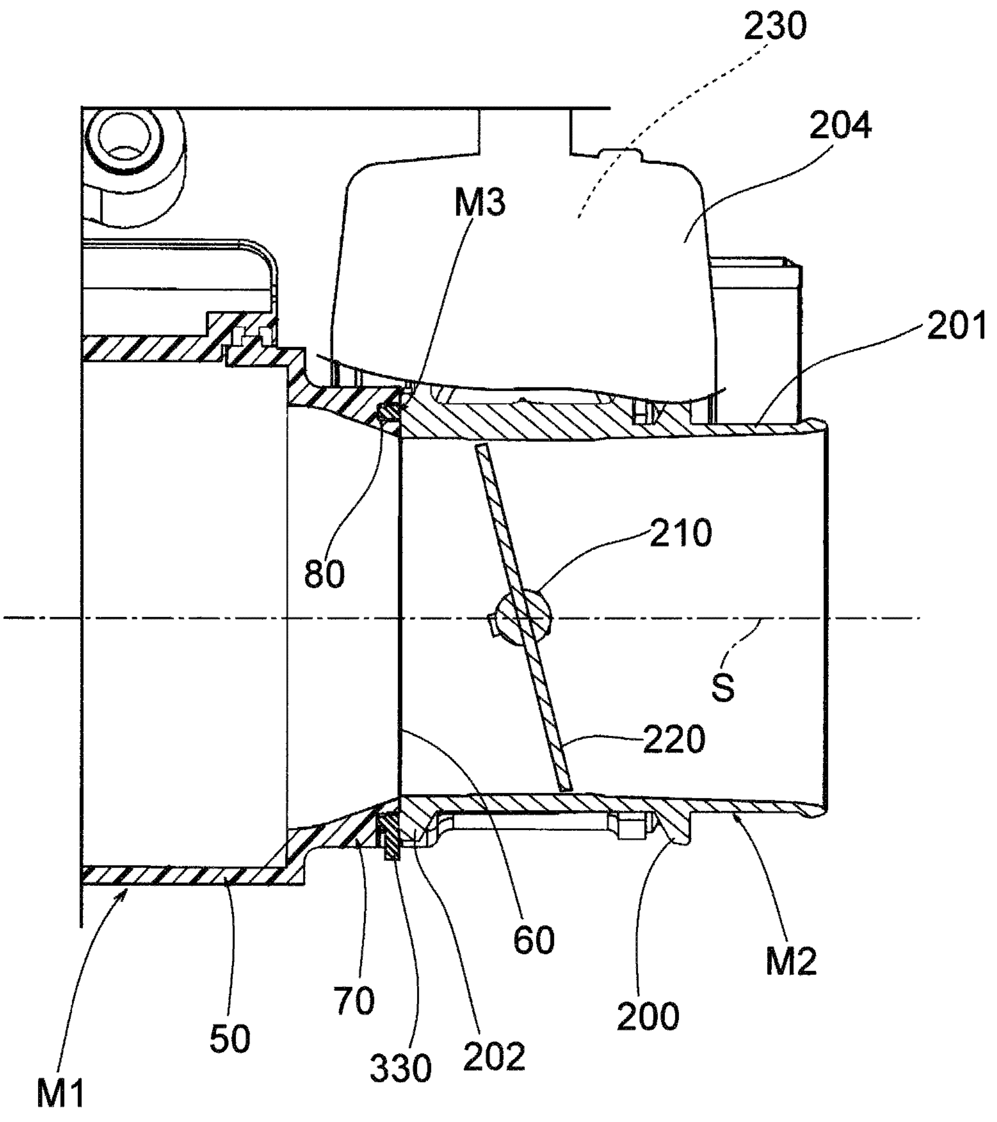
FIG. 7 is a partial cross-sectional view illustrating the intake system according an embodiment cut at a surface including the axis.
Figure 8:
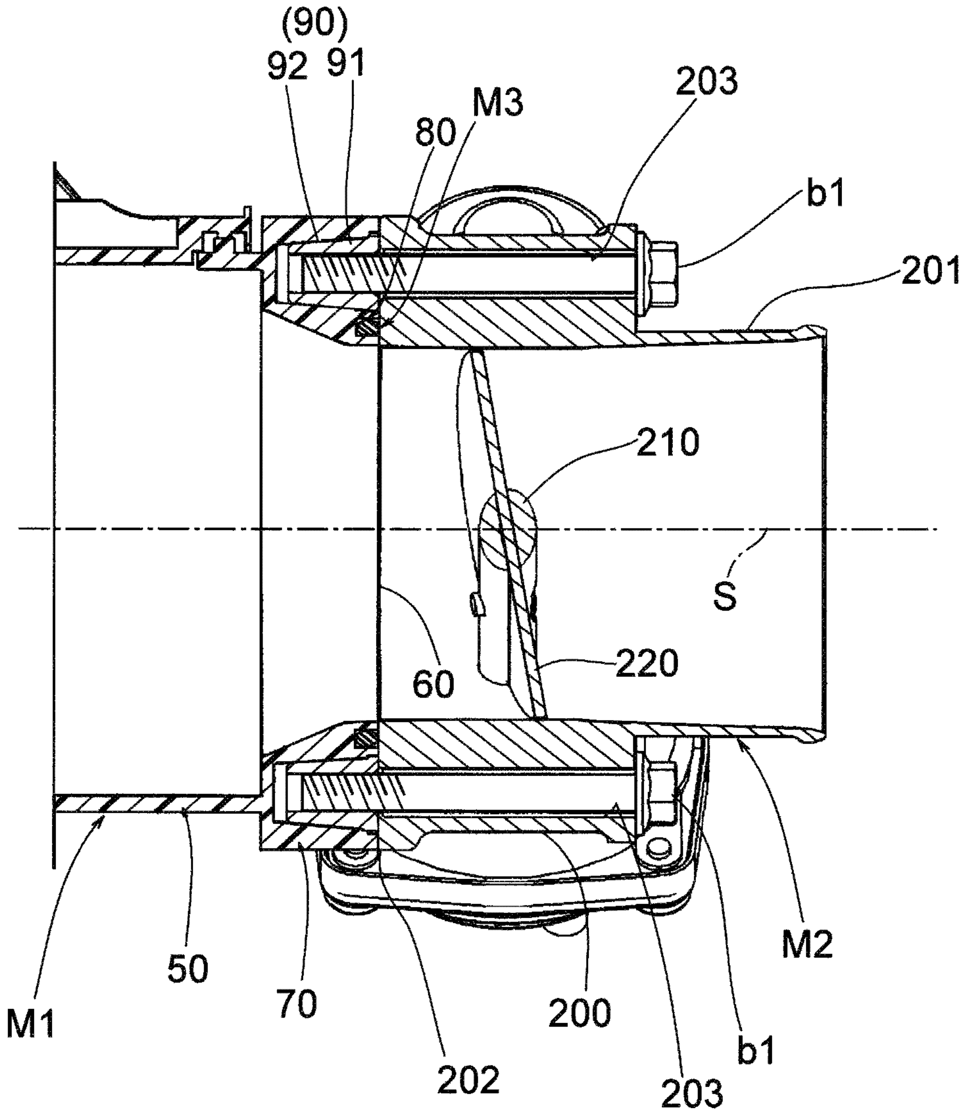
FIG. 8 is a partial cross-sectional view illustrating the intake system according an embodiment cut at a surface including the axis at an angle different from that of the cross-section shown in FIG. 6.

The opening part 60 is formed in a circular shape with the axis S as the center at the upstream end of the upstream tubular part 50, so as to guide the intake air into the surge tank 10. In addition, as shown in FIGS. 7 and 8, the passage area of the opening part 60 is formed to be the same as the passage area at the downstream end of the throttle unit M2. In addition, as the passage of the intake air, the passage area is formed to expand from the opening part 60 toward the upstream tubular part 50.

Figure 9:
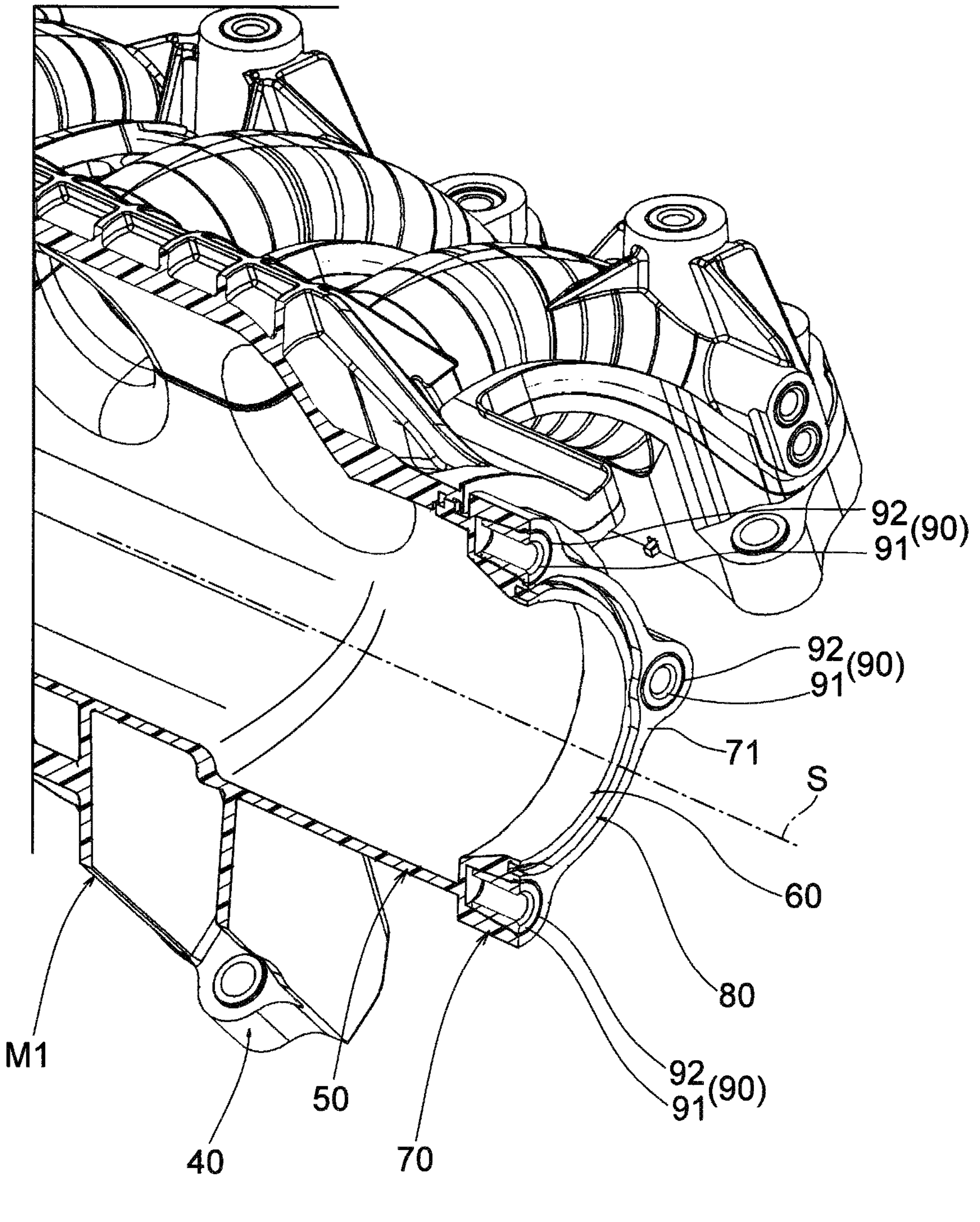
FIG. 9 is a partial cross-sectional perspective view illustrating a state in which the intake manifold as shown in FIG. is cut at a surface including the axis.
Figure 10:
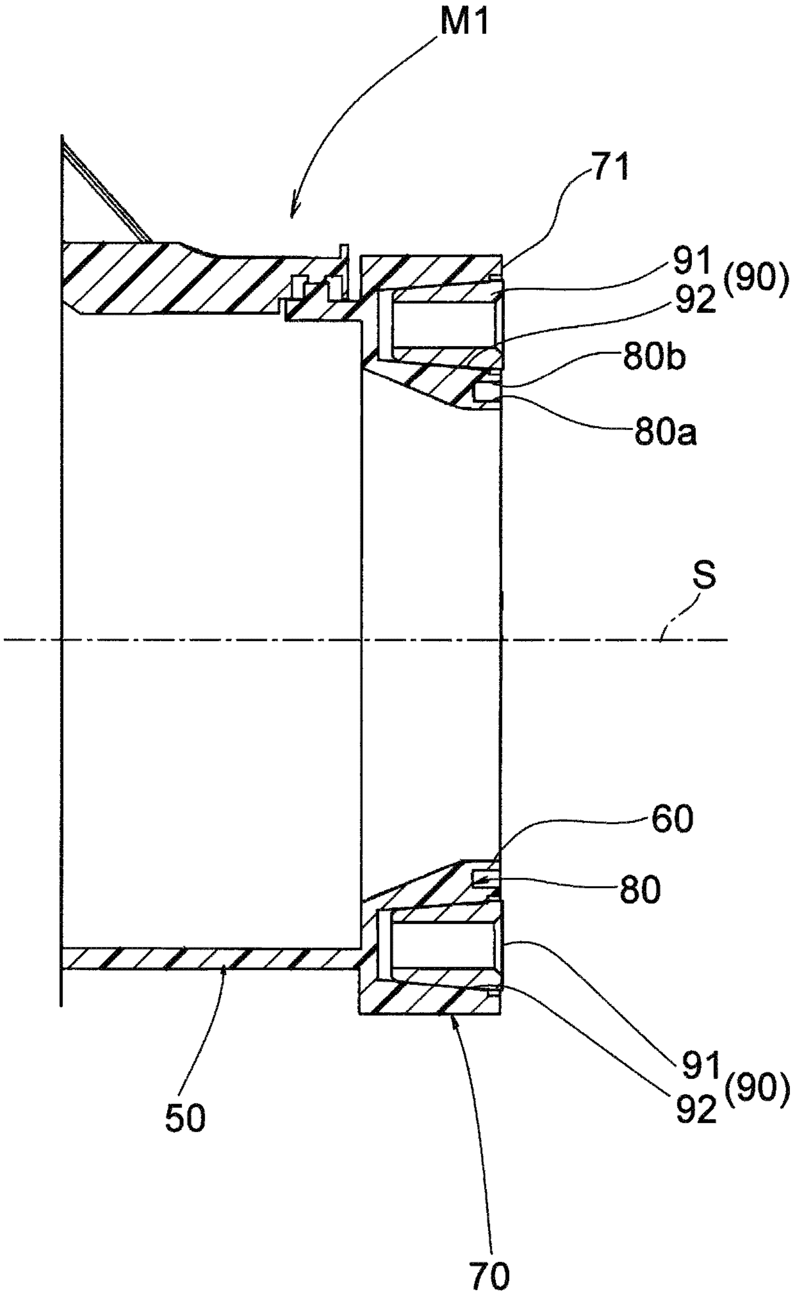
FIG. 10 is a partial cross-sectional view illustrating the cross-section shown in FIG. 9 from a front view.

As shown in FIGS. 2 and 9, the flange part 70 is continuous with the end of the upstream tubular part 50 in the direction of the axis S, and is formed around the opening part 60. In addition, as shown in FIGS. 3 and 11, the flange part 70 is formed in a shape that is point-symmetric with the axis S as the center, defines an outer profile 70*a* in which portions of the four fastening parts 90 protrude in a convex shape toward the radially outer side perpendicular to the axis S, and includes a bonding surface 71 as a flat surface perpendicular to the axis S.

In addition, as shown in FIG. 6, when viewed from the direction of the axis S, the flange part 70 is formed, so that the outer profile 70*a* of the flange part 70 does not protrude from the outer profile 50*a* of the upstream tubular part 50, that is, so that the outer profile 70*a* is located on the radially inner side (inner side approaching the axis S) with respect to the outer profile 50*a* on a surface perpendicular to the axis S.

The annular seal groove 80 is formed as a concave grove on the bonding surface 71 of the flange part 70 on the periphery of the opening part 60, so that the annular seal member M3 is fit with the annular seal groove 80.

Figure 11:
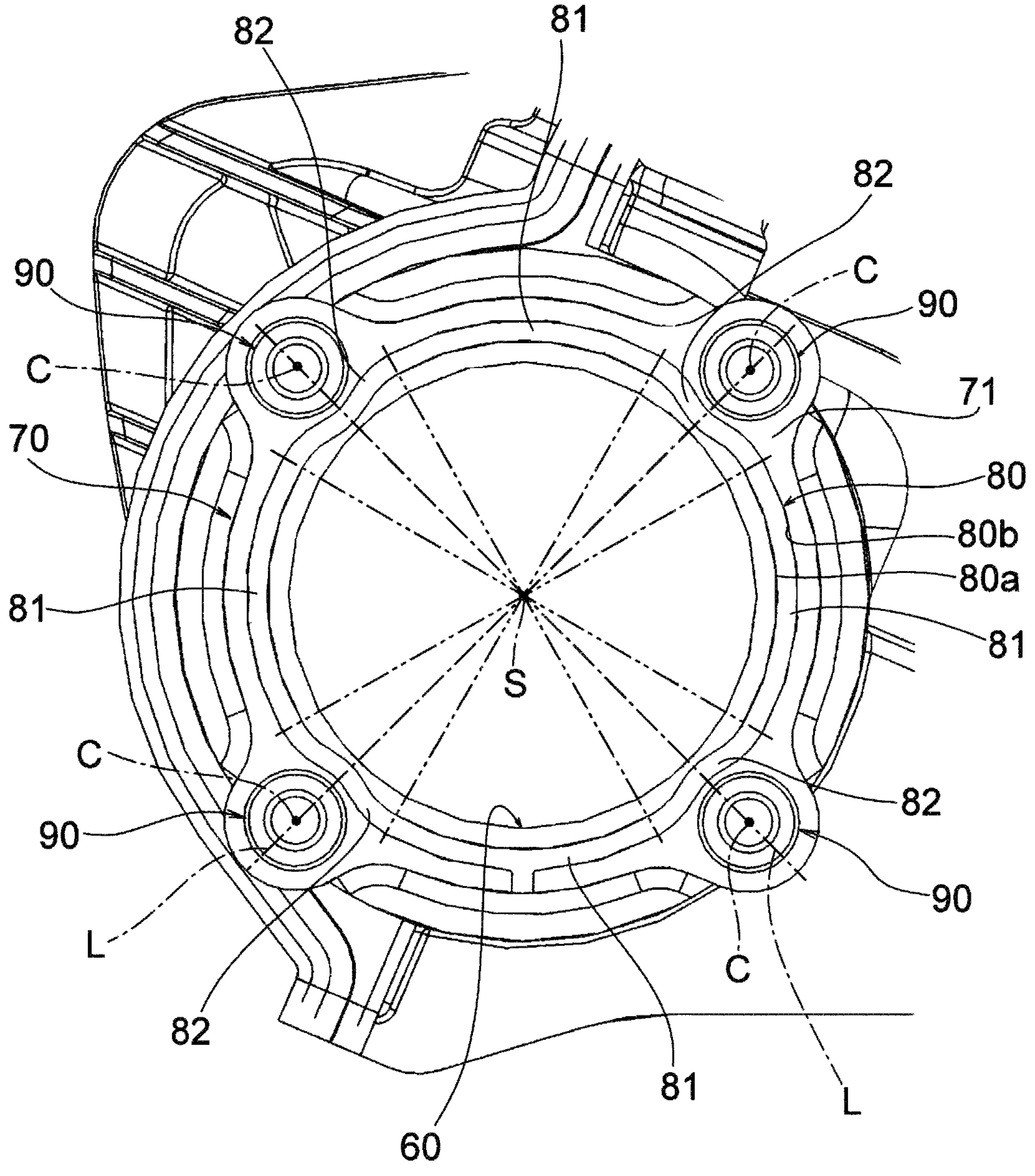
FIG. 11 is an end view illustrating a portion of a flange part of the intake manifold shown in FIG. 4 when viewed from the direction of the axis.
Figure 12:
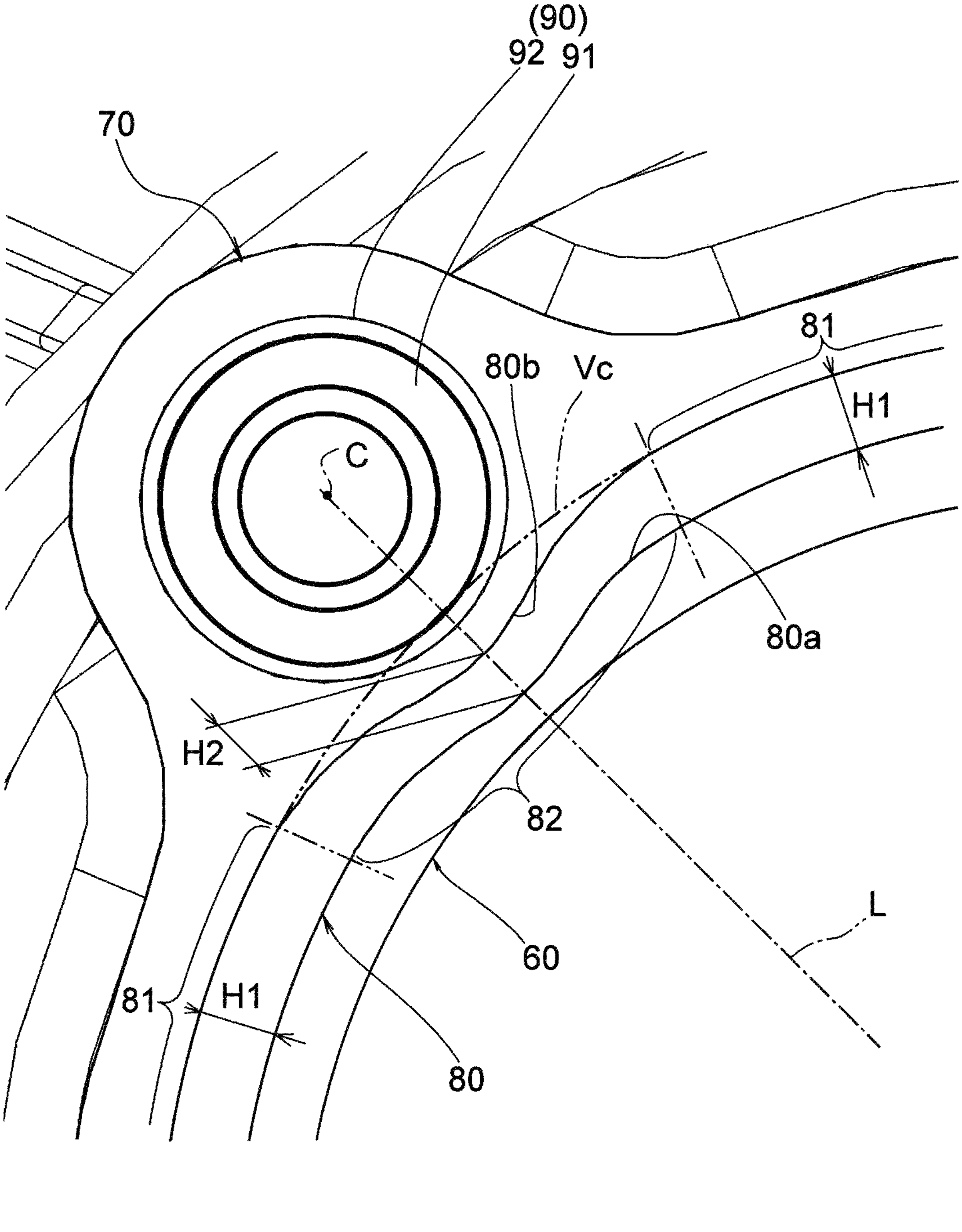
FIG. 12 is an enlarged cross-sectional view in which the vicinity of a fastening part included in the flange part of the intake manifold shown in FIG. 11 is partially enlarged.

As shown in FIGS. 11 and 12, the annular seal groove 80 is formed in a substantially annular shape with the axis S as the center, and is specifically formed by four width-invariant regions 81 and four width-gradually-variant regions 82. The width-invariant region 81 forms a portion of the annular shape with the axis S as the center. The width-gradually-variant region 82 is curved in a convex shape toward the inner side to approach the opening part 60 (axis S) in the vicinity of the fastening part 90.

The width-invariant region 81 is formed as a concave groove in a substantially rectangular shape forming a constant groove width H1. The width-gradually-variant region 82, as shown in FIG. 12, is formed in the vicinity of the fastening part 90, and is formed as a concave groove having a substantially rectangular shape in which the groove width varies gradually and continuously, that is, the groove width varies continuously from the groove width H1 to a groove width H2 (H2<H1) and then to the groove width H1, so that the groove width gradually decreases toward the fastening part 90 and gradually increases away from the fastening part 90.

In addition, in the width-gradually-variant region 82, as shown in FIGS. 11 and 12, a minimum groove width H2 is formed in a region sandwiched between the opening part 60 and the fastening part 90 and on a line L orthogonal to the axis S passing through the center C of the fastening part 90.

The minimum groove width H2 may be formed on the line L only, or may also be formed over a predetermined region of equal distances on both sides from the line L.

Figure 13:
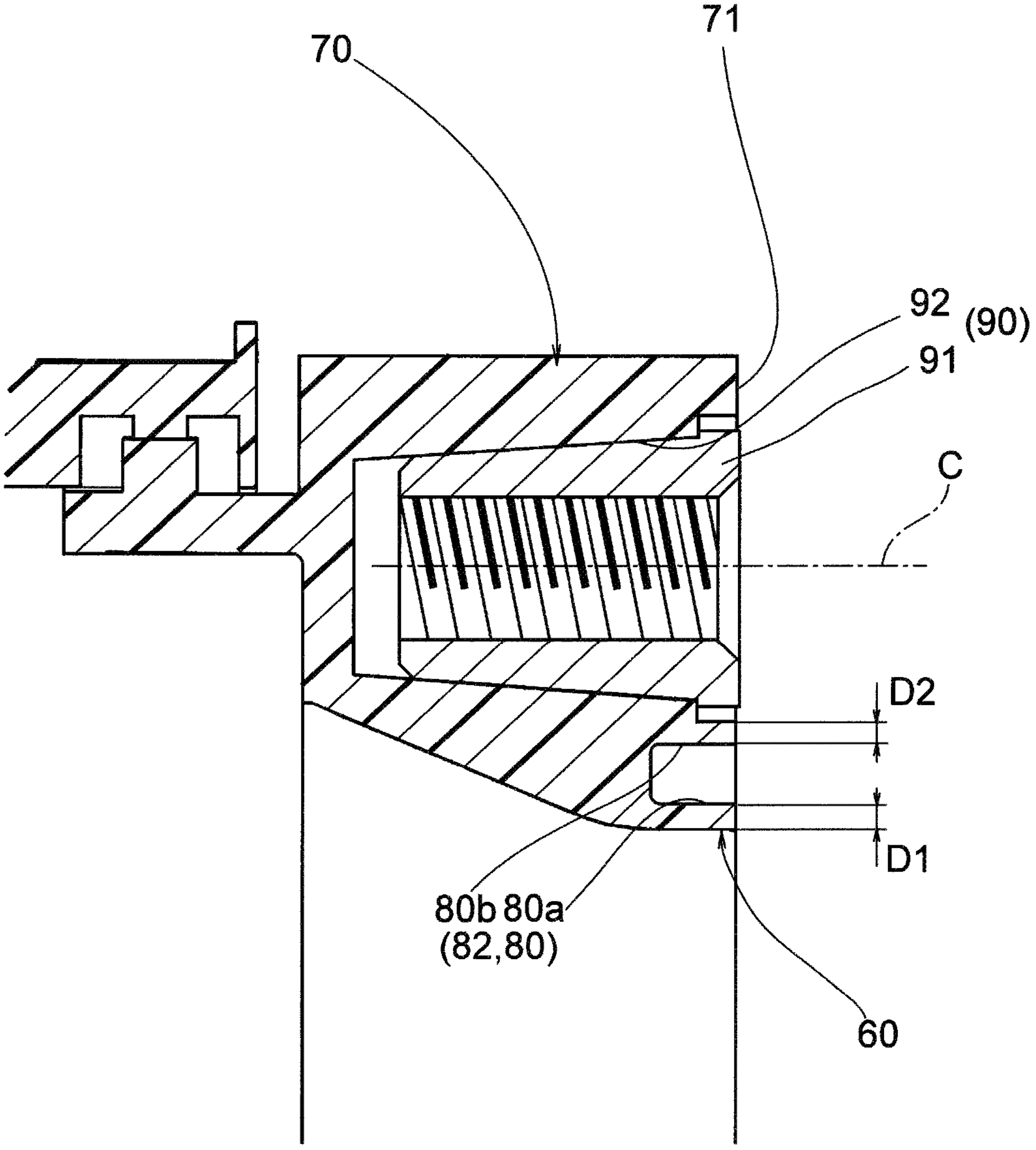
FIG. 13 is an enlarged end view partially illustrating the flange part, the fastening part (nut, fixing hole), an annular seal groove, and an opening part in the partial cross-sectional view shown in FIG. 10.

In addition, as shown in FIGS. 12 and 13, a thickness D1 of an inner wall 80*a* and a thickness D2 of an outer wall 80*b* defining the annular seal groove 80 are formed to be the same (D1=D2) in the region sandwiched by the opening part 60 and a fixing hole 92 of the fastening part 90 and on the line L orthogonal to the axis S.

The four fastening parts 90 fasten the throttle unit M2, and formed at the flange part 70 around the annular seal groove 80. In addition, the four fastening parts 90 are disposed at equal intervals (intervals of 90 degrees) in the circumferential direction with the axis S as the center. As shown in FIGS. 8 to 13, each fastening part 90 includes a nut 91 screwed with the fastening bolt b1 and the fixing hole 92 for inserting or outserting the nut 91.

Here, inserting refers to disposing the nut 91 in a mold and integrally molding the nut 91 together with the fixing hole 92 at the time of resin molding the intake manifold M1. Meanwhile, outserting refers to cold press-fitting and fixing the nut 91 to the fixing hole 92 after resin molding of the intake manifold M1 or hot press-fitting and fixing the nut 91 to the fixing hole 92 in a state in which the nut 91 is heated.

Here, the case where the nut 91 is outserted with respect to the fixing hole 92 is shown. That is, as shown in FIG. 13, the nut 91 is hot or cold press-fit with respect to the molded fixing hole 92 to be fixed to the fixing hole 92.

Here, as shown in FIG. 12, the fixing hole 92 is formed at a position partially overlapped with a virtual circle Vc passing through the outer diameter of the width-invariant region 81 (the inner circumferential surface of the outer wall 80*b*) of the annular seal groove 80. That is, the fixing hole 92 is formed by extending inwardly beyond the outer diameter of the width-invariant region 81, so as to approach the axis S in the radial direction orthogonal to the axis S.

In this way, in the configuration in which the four fastening parts 90 are disposed to be concentrated near the axis S, the groove width of the annular seal groove 80 decreases in the vicinity of the fastening part 90, that is, the groove width of the annular seal groove 80 is formed to decrease from the groove width H1 to the groove width H2. Compared with the case where the groove width is constant throughout the whole region, the thickness around the fixing hole 92 can be secured, the moldability can be facilitated, and the mechanical strength for fixing the nut 91 can be secured to facilitate reliability.

As shown in FIGS. 1 to 3 and FIGS. 7 and 8, the throttle unit M2 is bonded to the flange part 70 of the intake manifold M1 to be fixed by the fastening bolts B1, and includes a throttle body 200, a shaft 210, a throttle valve 220, and a driving unit 230, etc.

The throttle body 200 includes: a tubular part 201 defining a passage with the axis S as the center; a flange part 202 bonded to the flange part 70; four circular holes 203 through which the fastening bolts b1 pass; and an accommodation part 204 accommodating the driving unit 230.

The shaft 210 is disposed to expand toward an orientation orthogonal to the axis S, and is rotatably supported with respect to the throttle body 200.

The throttle valve 220 is fixed to the shaft 210, and is formed to open and close the passage through the rotation of the shaft 210 to adjust the amount of intake air flowing through the passage.

The driving unit 230 rotationally drives the shaft 210, and includes a driving motor, a deceleration gear train, etc.

In addition, in a state of being accommodated in the throttle body 200, as shown in FIG. 3, when viewed from the direction of the axis S, the driving unit 230 is disposed so as not protrude from the outer profiles 10*a*, 20*a* of the surge tank 10 and the branch pipe 20, that is, not to protrude toward the outer side from the outline OL of the intake manifold M1 (see FIG. 6).

The annular seal member M3 is fit with the annular seal groove 80 of the intake manifold M1 so as to be interposed between the flange part 70 of the intake manifold M1 and the flange part 202 of the throttle unit M2.

Figure 14:
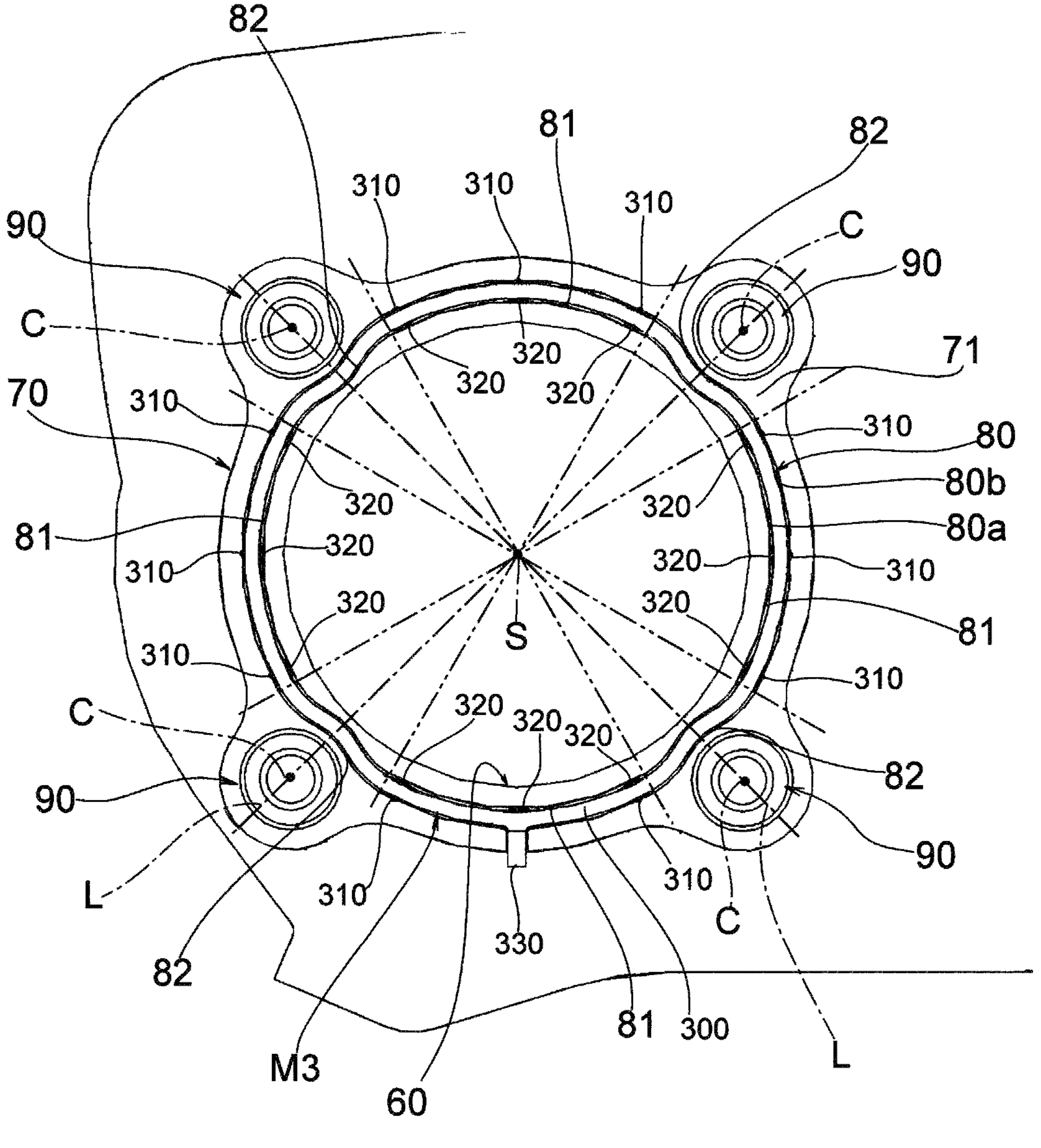
FIG. 14 is an end view illustrating a mutual relationship between the annular seal groove and the annular seal member in the intake manifold in the intake device according to an embodiment.
Figure 15:
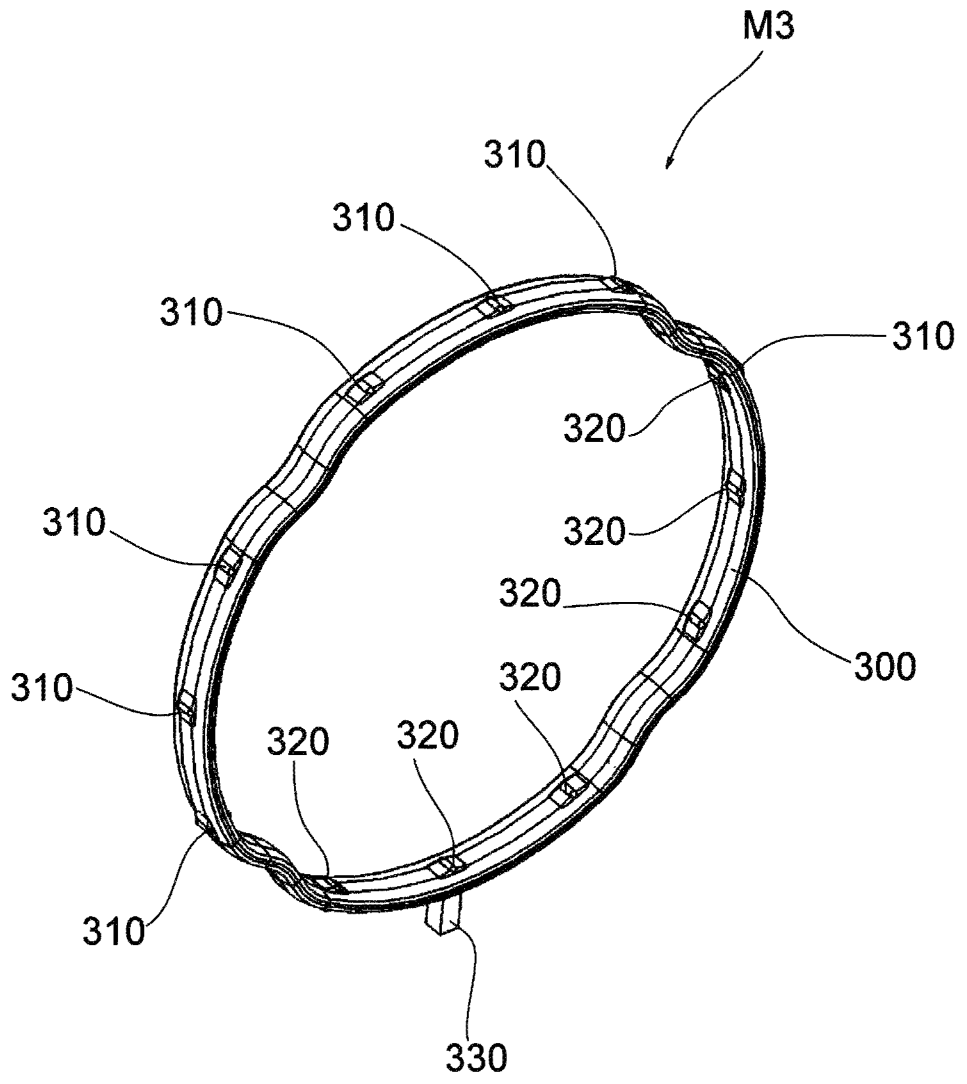
FIG. 15 is a perspective illustrating the appearance of the annular seal member included in the intake device according to an embodiment.
Figure 16:
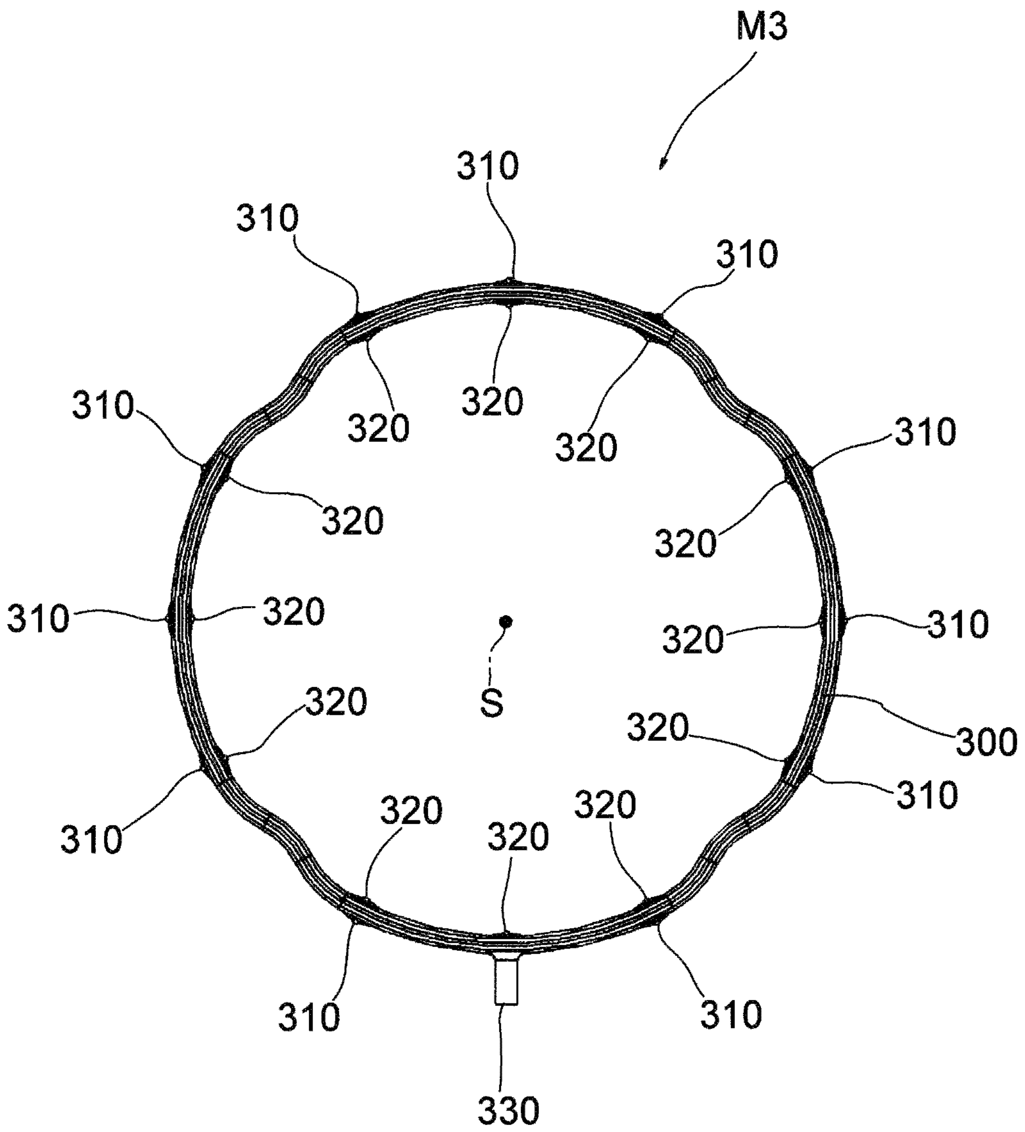
FIG. 16 is a front view illustrating the annular seal member included in the intake device according to an embodiment.

The annular seal member M3 is formed of a rubber material and, as shown in FIGS. 14 to 16, includes: an annular seal part 300 formed with a constant width; multiple (11 in the embodiment) outer convex parts 310 protruding toward the radially outer side from the annular seal part 300; multiple (12 in the embodiment) inner convex parts 320 protruding toward the radially inner side from the annular seal part 300; and an extension piece 330 extending toward the radially outer side from the annular seal part 300.

The annular seal part 300 is formed to have a constant width smaller than the minimum groove width H2 of the annular seal groove 80.

In an uncompressed state before fastening, the outer convex parts 310 are formed to be able to partially contact the outer wall 80*b* of the annular seal groove 80.

In an uncompressed state before fastening, the inner convex parts 320 are formed to be able to partially contact the inner wall 80*a* of the annular seal groove 80.

In addition, the annular seal member M3 is formed to include an annular region with the axis S as the center and curved regions in which the regions at four positions corresponding to the vicinities of the fastening parts 90 are curved to be convex toward the inner side.

In addition, the outer convex parts 310 and the inner convex parts 320, as shown in FIG. 14, are disposed in the width-invariant regions 81 formed with the constant width H1 in the annular seal groove 80.

That is, the outer convex parts 310 and the inner convex parts 320 are disposed in regions outside the width-gradually-variant regions 82 in which the groove width varies.

The fuel injection unit M4, as shown in FIGS. 1 and 3, includes: a feed pipe 410 supplying fuel; and four injectors 420 injecting fuel.

The feed pipe 410 serves as a common rail, is fixed to tip side regions of the branch pipes 20 by using the fastening bolts b2, and supplies high-pressure fuel toward the respective injectors 420. The injectors 420 are driven electromagnetically, and disposed to be fit with the fitting holes 22 of the respective branch pipes 20 to inject fuel into the passages of the branch pipes 20.

As described above, the intake manifold M1 according to an embodiment includes: the surge bank 10, formed in an elongated tubular shape in the direction of the predetermined axis S; the branch pipes 20, extending from the surge tank 10; the upstream tubular part 50, continuous on the upstream side of the surge tank 10; the opening part 60 open at the upstream end of the upstream tubular part 50; the flange part 70, formed around the opening part 60; the annular seal groove 80, formed on the flange part 70 around the opening part 60; and the fastening parts 90, formed on the flange part 70 around the annular seal groove 80 to fasten the throttle unit M2. The groove width of the annular seal groove 80 is formed to decrease in the vicinity of the fastening part 90.

Accordingly, the thickness in the vicinity of the fastening part 90 can be secured, the moldability at the time of molding can be facilitated, and the mechanical strength can be secured.

In addition, in the vicinity of the fastening part 90, the annular seal groove 80 is formed to be curved to be convex toward the inner side to approach the opening part 60.

Accordingly, the outer profile 70*a* of the flange part 70 can be reduced. As a result, the size of the intake manifold M1 can be reduced.

In addition, when viewed from the direction of the axis S, the flange part 70 is formed, so that the outer profile 70*a* of the flange part 70 does not protrude from the outer profile 50*a* of the upstream tubular part 50, that is, so that the outer profile 70*a* is located on the radially inner side (inner side approaching the axis S) with respect to the outer profile 50*a* on a surface perpendicular to the axis S.

Accordingly, with the flange part 70 being formed to not protrude toward the outer side with respect to the upstream tubular part 50, at the time of being mounted to a vehicle, the intake manifold M1, that is, the intake device can be disposed to not cause interference with other components in a narrow disposing space.

In addition, the fastening part 90 includes the nut 91 screwed with the fastening bolt b1 and the fixing hole for inserting or outserting the nut 91. The annular seal groove 80 includes the width-invariant region 81 with a constant groove width and the width-gradually-variant region 82 in which the groove width varies gradually and continuously to gradually decrease toward the fastening part 90 and gradually increase away from the fastening part 90. Accordingly, compared with the case where the groove width is constant throughout the whole region, the thickness around the fastening part 90 can be secured, and the seal properties can be secured, while the moldability at the time of molding can be facilitated, the mechanical strength can be secured, and the functional reliability can be facilitated.

In addition, the opening part 60 is circular with the axis S as the center, the fixing hole 92 of the fastening part 90 is circular, and the width-invariant region 81 of the annular seal groove 80 is formed to form a portion of the annular shape with the axis S as the center. Accordingly, the functional part including the fastening parts 90 can be disposed to be concentrated around the opening part 60, and uniform seal property can be secured in the circumferential direction around the axis S.

In addition, the thicknesses D1 and D2 of both of the inner wall 80*a* and the outer wall 80*b* defining the annular seal groove 80 are formed to be the same (D1=D2) in the region sandwiched by the opening part 60 and the fixing hole 92 and on the line L orthogonal to the axis S.

Accordingly, the mechanical strength of the fixing hole 92 and the mechanical strength of the annular seal groove 80 can be secured to be equivalent, while the moldability at the time of molding the intake manifold M1 can be facilitated.

In addition, the fixing hole 92 is formed at a position partially overlapped with the virtual circle Vc passing through the outer diameter of the width-invariant region 81 of the annular seal groove 80, that is, the fixing hole 92 is formed at a position near the axis S beyond the outer diameter of the width-invariant region 81.

Accordingly, the fastening parts 90 can be disposed to be concentrated near the axis S, and the outer profile 70*a* of the flange part 70 can be reduced. As a result, the size of the intake manifold M1 can be reduced.

In addition, the fastening parts 90 are disposed at equal intervals (here with intervals of 90 degrees) in the circumferential direction with the axis S as the center.

Accordingly, the throttle unit M2 can be firmly fixed to the intake manifold M1, the surface pressure on the seal surface in the circumferential direction around the axis S can be uniform, and the desired seal properties can be secured.

In addition, the intake device according to an embodiment is an intake device linked with the internal combustion engine and controlling the intake air, and includes: the intake manifold M1 according to any of the above configurations; the throttle unit M2 fastened to the flange part 70 of the intake manifold M1; and the annular seal member M3 made of rubber and fit with the annular seal groove 80 of the intake manifold M1 to be interposed between the flange part 70 and the throttle unit M2.

Accordingly, the size of the intake device can be reduced, the mechanical strength can be secured, the moldability can be facilitated, and favorable seal properties can be attained. At the time of being mounted to a vehicle, the intake device can be disposed to not cause interference with other components in a narrow disposing space.

In addition, the annular seal member M3 is formed to include the annular seal part 300 having a constant width smaller than the minimum groove width H2 of the annular seal groove 80.

Accordingly, even in the case where the annular seal groove 80 includes the width-gradually-variant region 82 where the groove width decreases, the annular seal member M3 can be fit easily, and favorable assembling properties can be attained.

In addition, the annular seal member M3 includes the outer convex parts 310 and the inner convex parts 320. In the uncompressed state before fastening, the outer convex parts 310 protrude from the annular seal part 300 to be able to partially contact the outer wall 80*b* of the annular seal groove 80, and the inner convex parts 320 protrude from the annular seal part 300 to be able to partially contact the inner wall 80*a* of the annular seal groove 80.

Accordingly, by providing the outer convex parts 310 and the inner convex parts 320, in the state before the throttle unit M2 is assembled, the annular seal member M3 can be prevented from falling off from the annular seal groove 80, and the operability at the time of assembling is facilitated.

In addition, the outer convex parts 310 and the inner convex parts 320 are disposed in the width-invariant regions 81 having a constant groove width in the annular seal groove 80.

That is, the outer convex parts 310 and the inner convex parts 320 are disposed in regions outside the width-gradually-variant regions 82 in which the groove width varies gradually, so the annular seal member M3 can be easily fit with the annular seal groove 80, and the assembling properties are facilitated.

In addition, the throttle unit M2 includes: the throttle valve 220 opening and closing the passage; and the driving unit 230 driving the throttle valve 220 to open and close. The branch pipes 20 of the intake manifold M1 are formed to be curved in a predetermined orientation when viewed from the direction of the axis S. In addition, when viewed from the direction of the axis S, the driving unit 230 is disposed to not protrude from the outer profiles 10*a*, 20*a* of the surge tank 10 and the branch pipes 20, that is, disposed to not protrude toward the outer side from the outline OL of the intake manifold ML.

Accordingly, by disposing the throttle unit M2 on the inner side of the outline OL of the intake manifold M1, the components as the intake device can be concentrated, and the size of the intake device as a whole can be reduced.

According to above, with the intake manifold M1 and the intake device having the configuration, the size can be reduced, the mechanical strength can be secured, and the moldability can be facilitated, while favorable assembling and seal properties can be attained.

In the embodiments, as the fastening parts, four fastening parts 90 are shown. However, the disclosure is not limited thereto. Three or other numbers of fastening parts may also be adopted.

In addition, as the fastening part, the fastening part 90 including the nut 91 and the fixing hole 92 is shown. However, the disclosure is not limited thereto. A configuration in which the fastening part is formed as a single through hole, and the nut is disposed on the back surface side of the flange part may also be adopted, and a configuration in which a head part of the fastening bolt is embedded in the flange part, and a screw part protrudes in the direction of the axis to pass through a circular hole 202 of the throttle unit M2 and the nut is screwed from the outer side may also be adopted.

In addition, in the embodiments, four branch pipes 20 are shown as the branch pipes. However, the disclosure is not limited thereto, and the intake manifold including the number of branch pipes corresponding to the number of cylinders of the internal combustion engine can be arranged.

In the embodiments, as the annular seal groove formed so that the groove width decreases in the vicinities of the fastening parts 90, the annular seal groove 80 including the width-gradually-variant regions 82 in which the groove width varies gradually and continuously so as to gradually decrease toward the fastening parts 90 and gradually increase away from the fastening parts 90 is shown. However, as long as the seal properties, the mechanical strength, and the moldability can be secured, if it is configured that the groove width decreases in the vicinity of the fastening parts, an annular seal groove in other configurations may also be adopted.

In the embodiments, as the annular seal member, the annular seal member M3 including the outer convex parts 310 and the inner convex parts 320 is shown. However, the disclosure is not limited thereto. An annular seal member including either the outer convex parts 310 or the inner convex parts 320 may also be adopted.

In addition, an annular seal member including only the annular seal part with a constant width may be adopted as long as the annular seal member does not easily fall off from the annular seal groove.

In the embodiments, the circular opening part 60 is shown as the opening part, the circular fixing hole 92 is shown as the fixing hole of the fastening part, and the width-invariant region 81 forming a portion of the annular shape with the axis S as the center is shown as the width-invariant region of the annular seal groove. However, the disclosure is not limited thereto. A configuration other than a circular shape may also be adopted.

As described above, the intake manifold and the intake device according to the disclosure can reduce the size, secure the mechanical strength, and facilitate the moldability, while attaining favorable assembling properties and seal properties. Therefore, in addition to being applicable to an internal combustion engine of an automobile, etc., the intake manifold and the intake device according to the disclosure are also applicable to an internal combustion engine mounted in other vehicles.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An intake manifold, comprising:

a surge tank, formed in an elongated tubular shape in a direction of a predetermined axis;

a plurality of branch pipes, extending from the surge tank; and an upstream tubular part, continuous on an upstream side of the surge tank, wherein the upstream tubular part comprises: an opening part, open at an upstream end of the upstream tubular part; and a flange part, formed around the opening part, wherein the flange part comprises: an annular seal groove, formed at the flange part around the opening part; and a plurality of fastening parts, formed at the flange part around the annular seal groove to fasten a throttle unit, and wherein a groove width of the annular seal groove is formed to decrease in a vicinity of the fastening part, the annular seal groove comprises a width-invariant region having a constant groove width and a width-gradually-variant region having a groove width that gradually and continuously varies so as to gradually decrease toward the fastening part and gradually increase away from the fastening part.

2. The intake manifold as claimed in claim 1, wherein, in the vicinity of the fastening part, the annular seal groove is formed to be curved to be convex toward an inner side, so as to approach the opening part.

3. The intake manifold as claimed in claim 1, wherein, when viewed from the direction of the axis, an outer profile of the flange part is formed not to protrude from an outer profile of the upstream tubular part.

4. The intake manifold as claimed in claim 1, wherein the fastening part comprises: a nut, configured for screwing with a fastening bolt; and a fixing hole, configured for inserting or outserting the nut.

5. The intake manifold as claimed in claim 4, wherein the opening part is in a circular shape with the axis as a center, the fixing hole is circular, and the width-invariant region of the annular seal groove forms a portion of an annular shape with the axis as a center.

6. The intake manifold as claimed in claim 5, wherein the fixing hole is formed at a position partially overlapped with a virtual circle passing through an outer diameter of the width-invariant region of the annular seal groove.

7. The intake manifold as claimed in claim 4, wherein thicknesses of both of an inner wall and an outer wall defining the annular seal groove are same in a region sandwiched between the opening part and the fixing hole and on a line orthogonal to the axis.

8. The intake manifold as claimed in claim 4, wherein the fastening parts are disposed at equal intervals in a circumferential direction with the axis as a center.

9. An intake device for controlling intake air of an internal combustion engine, the intake device comprising:

the intake manifold as claimed in claim 1;

a throttle unit, fastened to the flange part of the intake manifold; and an annular seal member, made of rubber, and fit with the annular seal groove of the intake manifold to be interposed between the flange part and the throttle unit.

10. The intake device as claimed in claim 9, wherein the annular seal member comprises an annular seal part having a constant width smaller than a minimum groove width of the annular seal groove.

11. The intake device as claimed in claim 9, wherein the annular seal member comprises a plurality of outer convex parts and/or a plurality of inner convex parts, and, in a uncompressed state before fastening, the outer convex parts protrude from the annular seal part to partially contact an outer wall of the annular seal groove, and the inner convex parts protrude from the annular seal part to partially contact an inner wall of the annular seal groove.

12. The intake device as claimed in claim 11, wherein the outer convex parts and/or the inner convex parts are formed to be disposed in width-invariant regions of the annular seal groove, the width-invariant regions having a constant groove width.

13. The intake device as claimed in claim 9, wherein the throttle unit comprises: a throttle valve, opening and closing a passage; and a driving unit, driving the throttle valve to open and close.

14. The intake device as claimed in claim 13, wherein the branch pipes of the intake manifold are curved in a predetermined orientation when viewed from the direction of the axis, and when viewed from the direction of the axis, the driving unit is disposed to not protrude from outer profiles of the surge tank and the branch pipes.

* * * * *